(12) United States Patent
Tabata et al.

(10) Patent No.: US 8,901,029 B2
(45) Date of Patent: Dec. 2, 2014

(54) POLYCONDENSATION CATALYST FOR PRODUCING POLYESTER AND METHOD FOR PRODUCING POLYESTER USING THE SAME

(75) Inventors: Keiichi Tabata, Sakai (JP); Akihiro Kamon, Sakai (JP); Jun Naito, Sakai (JP); Keiichi Ikegawa, Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 56 days.

(21) Appl. No.: 13/394,672

(22) PCT Filed: Sep. 10, 2010

(86) PCT No.: PCT/JP2010/066107
§ 371 (c)(1),
(2), (4) Date: Mar. 7, 2012

(87) PCT Pub. No.: WO2011/034156
PCT Pub. Date: Mar. 24, 2011

(65) Prior Publication Data
US 2012/0172571 A1    Jul. 5, 2012

(30) Foreign Application Priority Data

Sep. 15, 2009   (JP) ................................. 2009-212938

(51) Int. Cl.
*B01J 23/00*   (2006.01)
*C08G 63/85*   (2006.01)
*B01J 21/06*   (2006.01)
*C08G 63/00*   (2006.01)

(52) U.S. Cl.
CPC .............. *C08G 63/85* (2013.01); *B01J 21/063* (2013.01)
USPC ............................ 502/350; 502/351; 528/279

(58) Field of Classification Search
CPC ...... B01J 21/063; B01J 21/066; B01J 23/007; B01J 37/0221; B01J 37/0244; B01J 37/035; B01J 35/002; B01J 37/03; B01J 21/04; B01J 21/10; B01J 21/14; B01J 23/42; B01J 23/44; B01J 23/50; B01J 23/63
USPC .................................. 502/350, 351; 528/279
See application file for complete search history.

(56) References Cited

U.S. PATENT DOCUMENTS

2012/0172571 A1 *   7/2012   Tabata et al. .................. 528/279

FOREIGN PATENT DOCUMENTS

| JP | 2001-64377 | | 3/2001 |
|---|---|---|---|
| JP | 2001-114885 | | 4/2001 |
| JP | 2006-188567 | * | 7/2006 |
| JP | 2007-169425 | | 7/2007 |
| JP | 2007-177025 | | 7/2007 |
| JP | 2007-204537 | | 8/2007 |
| JP | 2008-007588 | | 1/2008 |
| JP | 2010-180270 | | 8/2010 |

OTHER PUBLICATIONS

International Search Report issued Dec. 21, 2010 in International (PCT) Application No. PCT/JP2010/066107, of which the present application is the national stage.

* cited by examiner

*Primary Examiner* — Ling Choi
*Assistant Examiner* — Gennadiy Mesh
(74) *Attorney, Agent, or Firm* — Wenderoth, Lind & Ponack, L.L.P.

(57) ABSTRACT

The invention provides a polycondensation catalyst for producing polyester by an esterification reaction or a transesterification reaction between a dicarboxylic acid or an ester-forming derivative thereof and a glycol, the polycondensation catalyst being obtained by hydrolyzing a water soluble titanium compound in the absence of a water soluble alkali in an aqueous slurry in which particles of a solid base are dispersed thereby to form on the surface of the particles of the solid base a coat layer of titanic acid in a content of from 0.1 to 50 parts by weight in terms of $TiO_2$ per 100 parts by weight of the solid base. The invention further provides a method for producing the polycondensation catalyst, and polyester obtained using the polycondensation catalyst.

7 Claims, No Drawings

POLYCONDENSATION CATALYST FOR PRODUCING POLYESTER AND METHOD FOR PRODUCING POLYESTER USING THE SAME

TECHNICAL FIELD

The present invention relates to a polycondensation catalyst for producing polyesters, a method for producing such a catalyst, polyesters obtained using such a polycondensation catalyst as well as a method for producing polyesters using such a polycondensation catalyst.

BACKGROUND ART

Polyesters typified by polyethylene terephthalate, polybutylene terephthalate and polyethylene naphthalate excel in mechanical and chemical properties, and are used in a wide variety of fields including fibers for clothes and industrial materials, films or sheets for packaging materials or magnetic tapes, bottles, which are hollow molded articles, casings of electric or electronic appliances, and other types of molded articles or components.

Certain representative polyesters, namely, polyesters composed of aromatic dicarboxylic acid components and alkylene glycol components as major constituents, such as polyethylene terephthalate, are produced by first preparing bis(2-hydroxyethyl)terephthalate (BHET) and oligomers containing the same by an esterification reaction between terephthalic acid and ethylene glycol or transesterification of dimethyl terephthalate and ethylene glycol, and then subjecting them to melt-polycondensation in vacuo at high temperatures in the presence of a polycondensation catalyst.

As such a polycondensation catalyst for producing polyesters, antimony trioxide is heretofore widely known. Antimony trioxide is a catalyst which is inexpensive and is of excellent catalytic activity, however, it has some problems. For example, antimony metal is precipitated during polycondensation of raw materials for polyester thereby making the resulting polyester darkened, or the resulting polyester is contaminated with foreign substances.

Thus, it is known that such an alkali as sodium hydroxide or potassium hydroxide is made to be present in a reaction system together with a catalyst in production of polyester so that coloring of the polyester obtained may be prevented (see a patent literature 1). Also in the case of an antimony trioxide catalyst, it is known that when it is used together with a certain amount of sodium oxide and iron oxide, the color tone of polyester obtained can be improved (see a patent literature 2). However, in recent years, as antimony trioxide is inherently poisonous, development of a catalyst free of antimony has been awaited.

Under such a situation, as a polycondensation catalyst for producing polyesters by ester interchange of dimethyl terephthalate and ethylene glycol, there are proposed, for example, glycol titanate (see a patent literature 3), and tetraalkoxy titanium (see a patent literature 4). In recent years, it is proposed to use as a polycondensation catalyst a solid titanium compound which is obtained by hydrolyzing a titanium halide or a titanium alkoxide to obtain hydroxides of titanium, and then heating the hydroxides at a temperature of 30-350° C. to dehydrate and dry the same (see patent literatures 5 and 6).

The titanium catalysts as described above have in many cases a high polymerization activity, but on the other hand, the polyesters obtained using such titanium catalysts are found to be colored yellow, and have problems in that they are readily degraded and colored when they are melt-molded, as well as they are inferior to transparency.

In order to solve such problems as mentioned above, a catalyst which is obtained by adding an aqueous solution of titanium tetrachloride and an aqueous solution of sodium hydroxide simultaneously to an aqueous slurry of particles of a solid base such as magnesium hydroxide or hydrotalcite to hydrolyze titanium tetrachloride to form a coat layer of titanic acid on the surfaces of the particles of the solid base is proposed (see a patent literature 7). However, also in the production of polyesters using such a catalyst, the polyesters obtained have hue which still must be improved. In addition, when polycondensation is carried out at a high temperature and under a reduced pressure, it is found that the polyester formed in part degrades by side reactions possibly due to the catalyst used.

[Patent literature 1] JP-B-S38-2143
[Patent literature 2] JP-A-H09-291141
[Patent literature 3] JP-B-S46-3395
[Patent literature 4] JP-A-S49-57092
[Patent literature 5] JP-A-2001-64377
[Patent literature 6] JP-A-2001-114885
[Patent literature 7] JP-A-2006-188567

DISCLOSURE OF THE INVENTION

Problems to be Solved by the Invention

The present inventors have made intensive research in order to solve the above mentioned problems involved in the conventional polycondensation catalysts for producing polyesters, and as a result, they have reached the present invention. They have obtained a polycondensation catalyst by adding an aqueous solution of a titanium halide to an aqueous slurry in which particles of a solid base are dispersed to hydrolyze the titanium halide in the absence of a water soluble alkali, thereby to form on the surfaces of particles of solid base a coat layer of titanic acid in a predetermined content in relation to the solid base. They have further found that the use of the catalyst makers it possible to provide polyesters which have a high molecular weight at a high polymerization activity while inhibiting degradation of polyesters formed possibly by side reactions due to the catalyst used, and which have hue remarkably improved and hardly suffer coloring due to thermal degradation during the melt-molding.

Therefore, it is an object of the invention to provide a polycondensation catalyst for producing polyesters which exhibit high catalytic activity and provide polyesters with remarkably improved hue although it contains no antimony. It is a further object of the invention to provide a method for producing such a catalyst, polyesters obtained using such a catalyst, and a method for producing polyesters using such a polycondensation catalyst.

Means to Solve the Problems

The invention provides a polycondensation catalyst for producing polyesters by an esterification reaction or a transesterification reaction between a dicarboxylic acid or an ester-forming derivative thereof and a glycol, the polycondensation catalyst being obtained by hydrolyzing a water soluble titanium compound in the absence of a water soluble alkali in an aqueous slurry in which particles of a solid base are dispersed, thereby to form on the surface of the particles of the solid base a coat layer of titanic acid in a content of from 0.1 to 50 parts by weight in terms of $TiO_2$ per 100 parts by weight of the solid base.

The invention also provides a method for producing a polycondensation catalyst for producing polyesters by an esterification reaction or a transesterification reaction between a dicarboxylic acid or an ester-forming derivative thereof and a glycol, the method comprising hydrolyzing a water soluble titanium compound in the absence of a water soluble alkali in an aqueous slurry in which particles of a solid base are dispersed, thereby to form on the surface of the particles of the solid base a coat layer of titanic acid in a content of from 0.1 to 50 parts by weight in terms of $TiO_2$ per 100 parts by weight of the solid base.

The invention further provides as a preferred embodiment a method for producing a polycondensation catalyst for producing polyesters by an esterification reaction or a transesterification reaction between a dicarboxylic acid or an ester-forming derivative thereof and a glycol, the method comprising hydrolyzing a water soluble titanium compound in the absence of a water soluble alkali in an aqueous slurry in which particles of a solid base are dispersed, thereby to form on the surface of the particles of the solid base a coat layer of titanic acid in a content of from 0.1 to 50 parts by weight in terms of $TiO_2$ per 100 parts by weight of the solid base, filtering an aqueous slurry of the thus obtained particles of the solid base having on the surface the coat layer of titanic acid to obtain a cake, washing the cake with water and drying the cake to obtain an aggregate, and disintegrating the aggregate.

The invention still further provides a method for producing polyesters comprising preparing oligomers comprising bis(hydroxyalkyl) esters of an aromatic dicarboxylic acid by an esterification reaction or a transesterification reaction of the aromatic dicarboxylic acid or an ester-forming derivative thereof and an alkylene glycol, and then subjecting the oligomers to melt-polycondensation at a high temperature and under a high vacuum in the presence of the polycondensation catalyst mentioned above.

In addition to the above mentioned, the invention provides a polyester obtained using the polycondensation catalyst mentioned above, and a polyester obtained by the method mentioned above.

Effect of the Invention

The polycondensation catalyst for producing polyester according to the invention is such that it is obtained by hydrolyzing a water soluble titanium compound in the absence of a water soluble alkali in an aqueous slurry in which particles of a solid base are dispersed when a coat layer of titanic acid is formed on the surface of the particles of the solid base. It has been found that the use of such a catalyst unexpectedly makes it possible to provide a polyester which has a high molecular weight at a high polymerization activity while inhibiting degradation of the polyester formed, and which has a hue remarkably improved.

EMBODIMENTS TO CARRY OUT THE INVENTION

The polycondensation catalyst of the invention for producing polyesters by an esterification reaction or a transesterification reaction between a dicarboxylic acid or an ester-forming derivative thereof and a glycol is such that it is obtained by hydrolyzing a water soluble titanium compound in the absence of a water soluble alkali in an aqueous slurry in which particles of a solid base are dispersed, thereby to form on the surface of the particles of the solid base a coat layer of titanic acid in a content of from 0.1 to 50 parts by weight in terms of $TiO_2$ per 100 parts by weight of the solid base.

According to the invention, there are mentioned, as a solid base, oxides or hydroxides of an alkaline earth metal, including a variety of composite oxides thereof, oxides of aluminum, zinc, lanthanum, zirconium, thorium, among others, and composite oxides thereof. These oxides and composite oxides may be in part substituted with a salt such as a carbonate. Accordingly, the solid base preferably used in the invention includes oxides and hydroxides of magnesium, calcium, strontium, barium, aluminum and zinc, and example of such oxides and hydroxides include, for example, magnesium hydroxide, calcium oxide, strontium oxide, barium oxide, zinc oxide, and a composite oxide such as hydrotalcite. Among these, magnesium hydroxide and hydrotalcite are particularly preferred.

In the invention, titanic acid is a hydrated titanium oxide represented by the general formula $TiO_2 \cdot nH_2O$ wherein n is a number satisfying the condition $0 < n \leq 2$. Such a titanic acid can be obtained, for example, by hydrolysis of a certain kind of titanium compound as described later.

When the content of coat layer formed of titanic acid is less than 0.1 part by weight in terms of $TiO_2$ in relation to 100 parts by weight of the solid base, the resulting catalyst has a low catalytic activity so that it fails to provide high molecular weight polyesters in a high productivity. When the content of coat layer formed of titanic acid is more than 50 parts by weight in terms of $TiO_2$ in relation to 100 parts by weight of the solid base, the resulting polyester easily degrades possibly by side reactions due to the catalyst used while it is produced, and has hue little improved. In addition, the resulting polyester is readily colored due to thermal deterioration during melt-molding.

The polycondensation catalyst of the invention is obtained by hydrolyzing a water soluble titanium compound in the absence of a water soluble alkali in an aqueous slurry in which particles of the solid base are dispersed at a temperature of from 5 to 100° C., preferably from 25 to 40° C., thereby to form on the surface of the particles of the solid base a coat layer of titanic acid in a content of from 0.1 to 50 parts by weight in terms of $TiO_2$ per 100 parts by weight of the solid base.

In more detail, for example, the polycondensation catalyst of the invention is obtained by, while maintaining an aqueous slurry of the particles of the solid base at a temperature of from 5 to 100° C., preferably from 25 to 40° C., adding to the aqueous slurry of the particles of the solid base an aqueous solution of a water soluble titanium compound in an amount of from 0.1 to 50 parts by weight in terms of $TiO_2$ per 100 parts by weight of the solid base, in order to hydrolyze the water soluble titanium compound in the absence of a water soluble alkali, that is, using no water soluble alkali, thereby to form a coat layer of titanic acid on the surface of the particles of the solid base, filtering an aqueous slurry of the particles of the solid base thus obtained having on the surface the coat layer of titanic acid to obtain a cake, washing the cake with water and drying to obtain an aggregate, and disintegrating the aggregate.

There are mentioned as examples of the water soluble titanic compound, titanium halides such as titanium tetrachloride, salts of inorganic acids such as titanium sulfate and titanium nitrate, salts of organic acids such as titanium oxalate, titanates such as titanyl ammonium oxalate, and among these, titanium halides such as titanium tetrachloride are preferred.

According to the invention, it is important that when a coat layer of titanic acid is formed on the surface of particles of the solid base, a predetermined amount of aqueous solution of a water soluble titanium compound is added to an aqueous slurry of the particles of the solid base to hydrolyze the water soluble titanium compound in the absence of a water soluble alkali thereby to form a coat layer of titanic acid on the surface of the particles of the solid base.

That is, according to the invention, adding an aqueous solution of a water soluble titanium compound to an aqueous slurry of the particles of the solid base thereby to hydrolyze the water soluble titanium compound in the absence of a water soluble alkali thereby to form a coat layer of titanic acid on the surface of the particles of the solid base means adding an aqueous solution of a water soluble titanium compound to an aqueous slurry of the particles of the solid base without adding a water soluble alkali to the aqueous slurry, and hydrolyzing the water soluble titanium compound.

According to the invention, the water soluble alkali is a water soluble alkali comprising an alkali metal element, and more specifically, a water soluble alkali comprising at least one of Ia group elements of periodic Table, that is, at least one of lithium, sodium, potassium, rubidium and cesium. The water soluble alkali is typically a water soluble alkali comprising at least one alkali metal element selected from lithium, sodium and potassium. The water soluble alkali includes hydroxides, carbonates and hydrogen carbonates. Accordingly, representative examples of the water soluble alkali include lithium hydroxide, sodium hydroxide and potassium hydroxide.

As described later, magnesium hydroxide is one of the solid bases preferably used in the invention. Magnesium hydroxide hardly dissolves in water. Therefore, in the invention, when magnesium hydroxide is used as a solid base, and a water soluble titanium compound is added to an aqueous slurry of magnesium hydroxide to hydrolyze the water soluble titanium compound, a trace amount of the magnesium hydroxide may unavoidably dissolves in the slurry. However, such a trace amount of magnesium hydroxide dissolved in the slurry is not considered as a water soluble alkali in the invention.

The solid base is preferably magnesium hydroxide or hydrotalcite. Therefore, one of the preferred polycondensation catalysts according to the invention is such that it comprises particles of magnesium hydroxide having on their surface a coat layer of titanic acid in a content of from 0.1 to 50 parts by weight in terms of $TiO_2$ per 100 parts by weight of magnesium hydroxide. Another preferred polycondensation catalyst according to the invention is such that it comprises hydrotalcite particles having on their surface a coat layer of titanic acid in a content of from 0.1 to 50 parts by weight in terms of $TiO_2$ per 100 parts by weight of hydrotalcite.

An aqueous slurry of particles of magnesium hydroxide is obtained, for example, by neutralizing an aqueous solution of a water-soluble magnesium salt such as magnesium chloride or magnesium nitrate with an alkali such as sodium hydroxide or ammonia, thereby precipitating magnesium hydroxide. An aqueous slurry of particles of magnesium hydroxide is obtained, for example, also by dispersing particles of magnesium hydroxide in water. When an aqueous slurry of particles of magnesium hydroxide is obtained by neutralizing an aqueous solution of a water soluble magnesium salt with an alkali, the aqueous solution of a water soluble magnesium salt and an alkali may be neutralized at the same time, or one of them may be added to the other.

The particles of magnesium hydroxide may be derived from any source. For example, they may be powder obtained by pulverizing natural ore or powder obtained by neutralizing an aqueous magnesium salt solution with an alkali. However, it is desirable that the particles of magnesium hydroxide contain an alkali metal in an amount as small as possible.

The hydrotalcite used for preparation of one of the preferred polycondensation catalysts comprising particles of hydrotalcite having on the surface a coat layer of titanic acid is preferably represented by the following general formula (I):

$$M^{2+}{}_{1-x}M^{3+}{}_x(OH^-)_2 A^{n-}{}_{x/n} \cdot mH_2O \tag{I}$$

wherein $M^{2+}$ denotes at least one divalent metal ion selected from $Mg^{2+}$, $Zn^{2+}$ and $Cu^{2+}$; $M^{3+}$ denotes at least one trivalent metal ion selected from $Al^{3+}$, $Fe^{3+}$ and $Ti^{3+}$; $A^{n-}$ denotes at least one anion selected from $SO_4^{2-}$, $Cl^-$, $CO_3^{2-}$ and $OH^-$; n denotes the valence of the anion; x is a number satisfying the condition $0<x<0.5$; and m is a number satisfying the condition $0 \leq m < 2$.

In particular, the hydrotalcite preferably used in the invention is such hydrotalcite in which $M^{2+}$ is $Mg^{2+}$, $M^{3+}$ is $Al^{3+}$, and $A^{n-}$ is $CO_3^{2-}$, i.e., such hydrotalcite represented by the general formula (II) is preferably used:

$$Mg^{2+}{}_{1-x}Al^{3+}{}_x(OH^-)_2(CO_3^{2-})_{x/2} \cdot mH_2O \tag{II}$$

wherein x and m have meanings the same as those mentioned above. Although such a hydrotalcite is easily available as a marketed product, it can be produced, if necessary, by a conventionally known method, e.g. a hydrothermal method, using proper materials.

The method for producing polyesters according to the invention comprises conducting an esterification reaction or a transesterification reaction between a dicarboxylic acid or an ester-forming derivative thereof and a glycol in the presence of the polycondensation catalyst described above.

In the invention, examples of the dicarboxylic acid include aliphatic dicarboxylic acids exemplified by succinic acid, glutaric acid, adipic acid and dodecanedicarboxylic acid and their ester-forming derivatives such as dialkyl esters; and aromatic dicarboxylic acids exemplified by terephthalic acid, isophthalic acid and naphthalene dicarboxylic acid and their ester-forming derivatives such as dialkyl esters. In the invention, examples of the glycol include ethylene glycol, propylene glycol, diethylene glycol, triethylene glycol, butylene glycol and 1,4-cyclohexanedimethanol.

Among the examples provided above, for example, aromatic dicarboxylic acids such as terephthalic acid, isophthalic acid and naphthalene dicarboxylic acid are preferably used as the dicarboxylic acid; and alkylene glycols such as ethylene glycol, propylene glycol and butylene glycol are preferably used as the glycol.

Therefore, in the invention, specific examples of preferred polyesters include polyethylene terephthalate, polybutylene terephthalate, polypropylene terephthalate, polyethylene naphthalate, polybutylene naphthalate, polypropylene naphthalate and poly(1,4-cyclohexane dimethylene terephthalate).

However, neither the dicarboxylic acid or its ester-forming derivative nor the glycol or its ester-forming derivative is limited to the examples listed above. Further, the resulting polyester is not limited to the examples shown above.

In general, a polyester represented by polyethylene terephthalate has been produced by any of the following methods: a method comprising producing low molecular weight oligomers containing the aforementioned BHET by a direct esterification of a dicarboxylic acid represented by terephthalic acid and a glycol represented by ethylene glycol, and subjecting the oligomers to melt-polycondensation in the presence of a polycondensation catalyst under a high vacuum at a high temperature to yield a polyester with a desired molecular weight; and a method comprising producing, like the foregoing method, a low molecular weight oligomer containing the aforementioned BHET by a transesterification of a dialkyl terephthalate represented by dimethyl terephthalate and a glycol represented by ethylene glycol, and subjecting the oligomers to melt-polycondensation in the presence of a polycondensation catalyst under a high vacuum and at a high temperature to yield a polyester with a desired molecular weight.

Also in the invention, a polyester having a desired molecular weight can be obtained by producing low molecular weight oligomers containing the BHET mentioned hereinbefore by the above mentioned direct esterification reaction or transesterification reaction, and then subjecting the oligomers to melt-polycondensation in the presence of the polycondensation catalyst of the invention under a high vacuum and at a high temperature in the conventionally known manner as described above.

For example, polyethylene terephthalate is produced as follows. In accordance with an ordinary method, as conventionally known, low molecular weight oligomers containing BHET can be obtained by feeding dimethyl terephtalate and ethylene glycol together with a catalyst such as calcium acetate into a reactor, heating them under a normal pressure to react them together at a reflux temperature while distilling off methanol from the reaction system. The degree of polymerization of the oligomers is usually up to about 10. If necessary, the reaction may be conducted under pressure. The reaction can be traced by measuring the amount of methanol distilled. The esterification ratio is usually about 95%.

When a direct esterification reaction is employed, low molecular weight oligomers containing BHET can be obtained by feeding terephthalic acid and ethylene glycol into a reactor and heating them, if necessary under pressure, while distilling off the water formed. In the direct esterification reaction, it is preferable to add previously prepared low molecular weight oligomers containing BHET together with raw materials into a reactor and carry out the direct esterification reaction in the presence of the low molecular weight oligomers.

Subsequently, the thus obtained low molecular weight oligomers are transferred to a polymerization reactor and are heated under reduced pressure to a temperature not lower than the melting point of polyethylene terephthalate (typically 240 to 280° C.). Thus, the oligomers are subjected to melt-polycondensation while unreacted ethylene glycol and ethylene glycol resulting from the reaction are distilled off from the reaction system under monitoring of the viscosity of the molten reactants. According to necessity, the polycondensation reaction may be carried out by using a plurality of reactors and changing the reaction temperature and pressure optimally in each reactor. When the viscosity of the reaction mixture reaches a predetermined value, the pressure reduction is stopped and the pressure in the polymerization reactor is returned to a normal pressure with nitrogen gas. Then, the resulting polyester is discharged from the reactor, for example, in the form of strand, cooled rapidly with water, and cut to form pellets. According to the invention, a polyester having an intrinsic viscosity [$\eta$] of from 0.4 to 1.0 dL/g can be obtained in this way.

The polycondensation catalyst for producing polyesters of the invention may be added to a reaction system when direct esterification reaction or transesterification reaction for the production of the oligomers containing BHET is carried out, or alternatively may be added to the reaction system when low molecular weight oligomers are further subjected to polycondensation reaction after the oligomers are obtained. The polycondensation catalyst for producing polyesters of the invention may be added to a reaction system as it is, or it may be dispersed in a glycol used as a raw material, and added to a reaction system. The polycondensation catalyst of the invention can be readily dispersed in a glycol, in particular, ethylene glycol, so that it is preferred that the catalyst is added to a reaction system when direct esterification reaction or transesterification reaction for the production of the oligomers containing BHET is carried out.

The polycondensation catalyst of the invention is used usually in an amount within the range of from $1\times10^{-5}$ to $1\times10^{-1}$ parts by mol per 100 parts by mol of the dicarboxylic acid or its ester-forming derivative used. When the amount of the polycondensation catalyst of the invention is less than $1\times10^{-5}$ parts by mol per 100 parts by mol of the dicarboxylic acid or its ester-forming derivative used, the catalytic activity is not high enough and therefore it may be impossible to obtain a desired high molecular weight polyester. On the other hand, when it is more than $1\times10^{-1}$ parts by mol, the resulting polyester may be poor in thermal stability.

The polycondensation catalyst of the invention exhibit catalytic activity in solid state polymerization and solution polymerization as well as melt polymerization. In each case, therefore, the catalyst can be used for the production of polyester.

The polycondensation catalyst of the invention contains no antimony as an ingredient. Therefore, it does not make resulting polyesters darkened or it does not contaminate resulting polyesters as foreign substances. In addition, it has catalytic activity equal to or higher than those of catalysts containing antimony as an ingredient and can provide polyesters with excellent hue. Moreover, the poly-condensation catalyst of the invention is not poisonous and hence safe.

In the production of polyester by an esterification reaction or transesterification reaction of a dicarboxylic acid or its ester-forming derivative and a glycol, it is presumed that the acidic catalysis of titanic acid is to coordinate, as a Lewis acid, to a carbonyl group of a dicarboxylic acid or its ester-forming derivative to make the attack of the glycol to the carbonyl carbon easy and simultaneously accelerate the dissociation of glycol to increase the nucleophilicity thereof. However, when the acidic catalysis is too strong, undesirable side reactions probably occur to cause a degradation reaction or coloration of the resulting polyester.

It is presumed that since the polycondensation catalyst of the invention has as a first feature a coat layer formed of titanic acid on the surface of particles of a solid base, i.e., magnesium hydroxide or hydrotalcite, the acidic catalysis of the titanic acid is rendered moderate, and as a second feature the catalyst does not contain an alkali metal in an amount of 200 ppm or more, and as a result of synergetic effect of the two features, high molecular weight polyester having hue much improved is obtained.

However, any conventionally known polycondensation catalyst such as compounds of antimony, germanium, titanium, tin or aluminum may be used together with the polycondensation catalyst of the invention in the production of polyester unless the merit of use of the polycondensation catalyst of the invention is affected. In addition, if necessary, a phosphorus compound may be used together with the polycondensation catalyst of the invention so that the resulting polyester has an improved heat stability.

EXAMPLES

The invention is now described with reference to examples below; however, the invention is not limited to those examples. In the following Examples and Comparative Examples, the intrinsic viscosity of polyester obtained was measured in accordance with ISO 1628-1, and the color was measured using a 45° diffusion type color difference meter (SC2-CH, manufactured by Suga Test Instruments Co., Ltd.).

The meanings of the values of L*, a*, and b* in color tone are as follows. The value of L* is called a lightness index, one of the three attributes of color, that is, lightness, saturation and hue. Larger the value of L*, it shows more white, and smaller the value, it shows more black. The color of white has a value of L* of 100, while the color of black has a value of L* of 0. The values of a* and b* are called a chromaticity index, which indicates hue and saturation. Negative values of a* show green, while positive values show red. Negative values of b* show blue, while positive values show yellow.

Reference Example 1

Preparation of Aqueous Slurry of Magnesium Hydroxide

5 L of water was placed in a reactor, and then 16.7 L of 4 mol/L aqueous solution of magnesium chloride and 8.4 L of 14.3 mol/L aqueous solution of sodium hydroxide were added simultaneously thereto with stirring. Thereafter, a hydrothermal reaction was conducted at 170° C. for 0.5 hours. The thus obtained magnesium hydroxide was collected by filtration, and washed with water. The obtained cake was suspended in water again to prepare an aqueous slurry of magnesium hydroxide (having a concentration of 123 g/L).

Reference Example 2

Preparation of Aqueous Slurry of Hydrotalcite

A mixed solution of 2.6 L of 3.8 mol/L aqueous solution of magnesium sulfate and 2.6 L of 0.85 mol/L aqueous solution of aluminum sulfate and a mixed solution of 2.8 L of 9.3 mol/L aqueous solution of sodium hydroxide and 2.6 L of 2.54 mol/L aqueous solution of sodium carbonate were added simultaneously to a reactor with stirring, and then a hydrothermal reaction was conducted at 180° C. for 2 hours.

After completion of the reaction, the resulting slurry was filtered, and the obtained cake was washed with water, dried and pulverized to provide hydrotalcite having a composition $Mg_{0.7}Al_{0.3}(OH)_2(CO_3)_{0.15} \cdot 0.48H_2O$. The hydrotalcite was suspended in water to prepare an aqueous slurry of hydrotalcite (having a concentration of 100 g/L).

Example 1

Preparation of Polycondensation Catalyst A 0.018 L of aqueous solution of titanium tetrachloride (69.2 g/L in terms of $TiO_2$) was prepared. 9.0 L of the aqueous slurry of magnesium hydroxide (123 g/L) obtained in Reference Example 1 was placed in a 25-L capacity reactor. Then, the aqueous solution of titanium tetrachloride was added dropwise to the aqueous slurry of magnesium hydroxide over 0.02 hours. After completion of the addition, ageing was conducted for 1 hour, thereby a coat layer of titanic acid was formed on the surface of particles of magnesium hydroxide.

The thus obtained aqueous slurry of particles of magnesium hydroxide having on their surface a coat layer of titanic acid was filtered to obtain a cake, the cake was washed with water, and dried to obtain an aggregate. The aggregate was disintegrated to provide a polycondensation catalyst A of the invention. The content of coat layer of titanic acid in the polycondensation catalyst, in terms of $TiO_2$, was 0.1 part by weight per 100 parts by weight of magnesium hydroxide.

(Production of Polyester A)

43 g (0.26 mol) of terephthalic acid and 19 g (0.31 mol) of ethylene glycol were placed in a reactor, and stirred under a nitrogen atmosphere to prepare a slurry. An esterification reaction was performed over 4 hours while the temperature in the reactor was kept at 250° C. and the relative pressure based on the atmospheric pressure was kept at $1.2 \times 10^5$ Pa. 50 g of the thus obtained low-molecular weight oligomers was transferred to a polycondensation reactor held at 250° C. and normal pressure under a nitrogen gas atmosphere.

A slurry was prepared by dispersing 0.0025 g of the polycondensation catalyst A ($3.9 \times 10^{-5}$ mol, 0.015 parts by mol per 100 parts by mol of the terephthalic acid component subjected to the polycondensation) in ethylene glycol. Then, the slurry was added to the polycondensation reactor. Subsequently, the temperature in the reactor was increased from 250° C. to 280° C. over 3 hours. This temperature was maintained and the pressure was reduced from ordinary pressure to an absolute pressure of 40 Pa over 1 hour. While this pressure was maintained, heating was continued for additional two hours. Thus, a polycondensation reaction was carried out. After the termination of the polycondensation reaction, the pressure in the reactor was returned to normal pressure with nitrogen gas. The resulting polyester was discharged in a strand form through an outlet opening at the bottom of the reactor. The strand was cooled rapidly and cut, providing polyester pellets. The intrinsic viscosity and color tone of the thus obtained polyester are shown in Table 1.

Example 2

Preparation of Polycondensation Catalyst B 0.016 L of aqueous solution of titanium tetrachloride (69.2 g/L in terms of $TiO_2$) was prepared. 9.0 L of the aqueous slurry of magnesium hydroxide (123 g/L) obtained in Reference Example 1 was placed in a 25-L capacity reactor. Then, the aqueous solution of titanium tetrachloride was added dropwise to the aqueous slurry of magnesium hydroxide over 0.2 hours. After completion of the addition, ageing was conducted for 1 hour, thereby a coat layer of titanic acid was formed on the surface of particles of magnesium hydroxide.

The thus obtained aqueous slurry of particles of magnesium hydroxide having on their surface a coat layer of titanic acid was filtered to obtain a cake, the cake was washed with water, and dried to obtain an aggregate, and then the aggregate was disintegrated, thereby to provide a polycondensation catalyst B of the invention. The content of coat layer of titanic acid in the polycondensation catalyst, in terms of $TiO_2$, was 1.0 part by weight per 100 parts by weight of magnesium hydroxide.

(Production of Polyester B)

The polycondensation catalyst B was used, and otherwise in the same manner as Example 1, polyester was obtained. The intrinsic viscosity and color tone of the thus obtained polyester are shown in Table 1.

Example 3

Preparation of Polycondensation Catalyst C 1.6 L of aqueous solution of titanium tetrachloride (69.2 g/L in terms of $TiO_2$) was prepared. 9.0 L of the aqueous slurry of magnesium hydroxide (123 g/L) obtained in Reference Example 1 was placed in a 25-L capacity reactor. Then, the aqueous solution of titanium tetrachloride was added dropwise to the aqueous slurry of magnesium hydroxide over 2 hours. After completion of the addition, ageing was conducted for 1 hour, thereby a coat layer of titanic acid was formed on the surface of particles of magnesium hydroxide.

The thus obtained aqueous slurry of particles of magnesium hydroxide having on their surface a coat layer of titanic acid was filtered to obtain a cake, the cake was washed with water, and dried to obtain an aggregate, and then the aggregate was disintegrated, thereby to provide a polycondensation catalyst C of the invention. The content of coat layer of titanic acid in the polycondensation catalyst, in terms of $TiO_2$, was 10 parts by weight per 100 parts by weight of magnesium hydroxide.

(Production of Polyester C)

The polycondensation catalyst C was used, and otherwise in the same manner as Example 1, polyester was obtained. The intrinsic viscosity and color tone of the thus obtained polyester are shown in Table 1.

Example 4

Preparation of Polycondensation Catalyst D 8.0 L of aqueous solution of titanium tetrachloride (69.2 g/L in terms of $TiO_2$) was prepared. 9.0 L of the aqueous slurry of magnesium hydroxide (123 g/L) obtained in Reference Example 1 was placed in a 40-L capacity reactor. Then, the aqueous solution of titanium tetrachloride was added dropwise to the aqueous slurry of magnesium hydroxide over 10 hours. After completion of the addition, ageing was conducted for 1 hour, thereby a coat layer of titanic acid was formed on the surface of particles of magnesium hydroxide.

The thus obtained aqueous slurry of particles of magnesium hydroxide having on their surface a coat layer of titanic acid was filtered to obtain a cake, the cake was washed with water, and dried to obtain an aggregate, and then the aggregate was disintegrated, thereby to provide a polycondensation catalyst D of the invention. The content of coat layer of titanic acid in the polycondensation catalyst, in terms of $TiO_2$, was 50 parts by weight per 100 parts by weight of magnesium hydroxide.

(Production of Polyester D)

The polycondensation catalyst D was used, and otherwise in the same manner as Example 1, polyester was obtained. The intrinsic viscosity and color tone of the thus obtained polyester are shown in Table 1.

Example 5

Preparation of Polycondensation Catalyst E 0.72 L of aqueous solution of titanium tetrachloride (69.4 g/L in terms of $TiO_2$) was prepared. 5.0 L of the aqueous slurry of hydrotalcite (100 g/L) obtained in Reference Example 2 was placed in a 25-L capacity reactor. Then, the aqueous solution of titanium tetrachloride was added dropwise to the aqueous slurry of hydrotalcite over 2 hours. After completion of the addition, ageing was conducted for 1 hour, thereby a coat layer of titanic acid was formed on the surface of particles of hydrotalcite.

The thus obtained aqueous slurry of particles of hydrotalcite having on their surface a coat layer of titanic acid was filtered to obtain a cake, the cake was washed with water, and dried to obtain an aggregate, and then the aggregate was disintegrated, thereby to provide a polycondensation catalyst E of the invention. The content of coat layer of titanic acid in the polycondensation catalyst, in terms of $TiO_2$, was 10 parts by weight per 100 parts by weight of hydrotalcite.

(Production of Polyester E)

The polycondensation catalyst E was used, and otherwise in the same manner as Example 1, polyester was obtained. The intrinsic viscosity and color tone of the thus obtained polyester are shown in Table 1.

Comparative Example 1

Production of Polyester F

Polyester was obtained in the same manner as Example 1 except for using 0.0114 g ($3.9 \times 10^{-5}$ mol, 0.015 parts by mol per 100 parts by mol of terephthalic acid subjected to polycondensation) of antimony trioxide instead of polycondensation catalyst A. The intrinsic viscosity and color tone of the thus obtained polyester are shown in Table 1.

Comparative Example 2

Preparation of Polycondensation Catalyst F 1.6 L of aqueous solution of titanium tetrachloride (69.2 g/L in terms of $TiO_2$) and 1.6 L of aqueous solution of sodium hydroxide (99.6 g/L in terms of NaOH) were prepared. 9.0 L of aqueous slurry of magnesium hydroxide (123 g/L) obtained in Reference Example 1 was placed in a 25 L capacity reactor. Then, the aqueous solution of titanium tetrachloride and the aqueous solution of sodium hydroxide were added dropwise at the same time over a period of 2 hours to the aqueous slurry of magnesium hydroxide in such a manner that the resulting slurry had a pH of 10.0. After the addition, the slurry was aged for 1 hour to form a coat layer of titanic acid on the surface of particles of magnesium hydroxide.

The thus obtained aqueous slurry of particles of magnesium hydroxide having on the surface a coat layer of titanic acid was filtered, the obtained cake was washed with water, and dried, and the obtained aggregate was disintegrated, thereby to provide a polycondensation catalyst F.

In the polycondensation catalyst thus obtained, the content of coat layer of titanic acid was 10 parts by weight in terms of $TiO_2$ per 100 parts by weight of magnesium hydroxide.

(Production of Polyester G)

The polycondensation catalyst F was used, and otherwise in the same manner as Example 1, polyester was obtained. The intrinsic viscosity and color tone of the thus obtained polyester are shown in Table 1.

Comparative Example 3

Preparation of Polycondensation Catalyst G 0.72 L of aqueous solution of titanium tetrachloride (69.4 g/L in terms of $TiO_2$) and 0.72 L of aqueous solution of sodium hydroxide (100 g/L in terms of NaOH) were prepared. 5.0 L of aqueous slurry of hydrotalcite (100 g/L) obtained in Reference Example 2 was placed in a 25 L capacity reactor. Then, the aqueous solution of titanium tetrachloride and the aqueous solution of sodium hydroxide were added dropwise at the same time over a period of 2 hours to the aqueous slurry of hydrotalcite in such a manner that the resulting slurry had a pH of 9.0. After the addition, the slurry was aged for 1 hour to form a coat layer of titanic acid on the surface of particles of hydrotalcite.

The thus obtained aqueous slurry of particles of hydrotalcite having on the surface a coat layer of titanic acid was filtered, the obtained cake was washed with water, and dried, and the obtained aggregate was disintegrated, thereby to provide a polycondensation catalyst G.

In the polycondensation catalyst thus obtained, the content of coat layer of titanic acid was 10 parts by weight in terms of $TiO_2$ per 100 parts by weight of hydrotalcite.

(Production of Polyester H)

The polycondensation catalyst G was used, and otherwise in the same manner as Example 1, polyester was obtained. The intrinsic viscosity and color tone of the thus obtained polyester are shown in Table 1.

TABLE 1

| | Polycondensation Catalyst | Content of Coat Layer of Titanic Acid*) (parts by weight) | Polyester | Intrinsic Viscosity (dL/g) | Color Tone | | |
|---|---|---|---|---|---|---|---|
| | | | | | L* | a* | b* |
| Example 1 | A | 0.1 | a | 0.60 | 54.6 | −0.7 | 2.5 |
| Example 2 | B | 1.0 | b | 0.62 | 54.7 | −0.5 | 2.1 |
| Example 3 | C | 10 | c | 0.63 | 53.0 | −0.2 | 2.0 |
| Example 4 | D | 50 | d | 0.62 | 54.0 | −0.6 | 2.2 |
| Example 5 | E | 10 | e | 0.61 | 56.0 | −0.5 | 2.0 |
| Comparative 1 | Antimony Trioxide | — | f | 0.62 | 55.5 | −0.8 | 1.9 |
| Comparative 2 | F | 10 | g | 0.62 | 52.1 | −0.9 | 3.8 |
| Comparative 3 | G | 10 | h | 0.63 | 53.1 | −0.7 | 3.5 |

Note
*) Content of coat layer of titanic acid (in terms of $TiO_2$) per 100 parts by weight of solid base As clear from the results shown in Table 1, the use of catalyst of the invention in production of polyester provides a polyester having almost the same high molecular weight as that of a polyester obtained when antimony trioxide is used as a catalyst (Comparative Example 1) while inhibiting degradation of polyester formed.

Furthermore, the polyester obtained according to the invention has a value of b* much smaller than that of a polyester obtained by using a catalyst which is obtained by hydrolyzing a water soluble titanium compound in the presence of a water soluble alkali to form a coat layer of titanic acid on the surfaces of particles of a solid base (Comparative Examples 2 and 3). That is, the polyester obtained according to the invention has a value of b* which is reduced nearly to a value of b* of a polyester obtained by using antimony trioxide as a catalyst, and hence the polyester obtained according to the invention is remarkably improved in hue as yellowing is inhibited.

The invention claimed is:

1. A method for producing a catalyst for producing polyester by an esterification reaction or a transesterification reaction between a dicarboxylic acid or an ester-forming derivative thereof and a glycol, the method comprising hydrolyzing a water soluble titanium compound, in the absence of a water soluble alkali including ammonia, in an aqueous slurry in which particles of a solid base are dispersed thereby to form on the surface of the particles of the solid base a coat layer of titanic acid in a content of from 0.1 to 50 parts by weight in terms of TiO2 per 100 parts by weight of the solid base.

2. The method according to claim 1, wherein the coat layer is formed on the surface of the particles of the solid base, an aqueous slurry containing the thus obtained particles of the solid base having on the surface the coat layer of titanic acid is filtered, the obtained cake is washed with water, dried, and the obtained aggregate is disintegrated.

3. The method according to claim 1, wherein the solid base is magnesium hydroxide.

4. The method according to claim 1, wherein the solid base is hydrotalcite.

5. The method according to claim 1, wherein the water soluble titanium compound is a titanium halide.

6. The method according to claim 1, wherein the titanium halide is titanium tetrachloride.

7. The method according to claim 1, wherein the water soluble alkali is a water soluble alkali which comprises an alkali metal element.

* * * * *